(12) United States Patent
Friedmann

(10) Patent No.: US 8,327,990 B2
(45) Date of Patent: Dec. 11, 2012

(54) CLUTCH UNIT

(75) Inventor: Oswald Friedmann, Lichtenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 532 days.

(21) Appl. No.: 12/322,518

(22) Filed: Feb. 2, 2009

(65) Prior Publication Data

US 2009/0205923 A1    Aug. 20, 2009

(30) Foreign Application Priority Data

Jan. 31, 2008   (DE) .................. 10 2008 007 055

(51) Int. Cl.
*F16D 13/68*      (2006.01)
(52) U.S. Cl. .................................. 192/70.17; 464/68.1
(58) Field of Classification Search ............... 192/70.17, 192/55.61, 212, 48.8, 48.91, 89.24; 464/66.1, 464/68.1
See application file for complete search history.

(56) References Cited

U.S. PATENT DOCUMENTS

| | | | | |
|---|---|---|---|---|
| 2,835,141 A * | 5/1958 | De Lorean | .................. | 464/68.1 |
| 4,026,400 A * | 5/1977 | Rawlings | ............... | 192/48.91 X |
| 5,649,348 A * | 7/1997 | Jackel et al. | | |
| 6,202,815 B1 * | 3/2001 | Bacher et al. | .......... | 192/89.24 X |
| 6,830,139 B2 * | 12/2004 | Carlson et al. | ............... | 192/48.8 |
| 6,910,562 B2 * | 6/2005 | Bauer et al. | ................. | 192/70.17 |
| 7,063,199 B2 * | 6/2006 | Weidinger et al. | ..... | 192/89.24 X |
| 7,066,313 B2 * | 6/2006 | Kimmig et al. | ........ | 192/89.24 X |
| 7,140,482 B2 * | 11/2006 | Weidinger et al. | ..... | 192/89.24 X |
| 7,143,886 B2 * | 12/2006 | Sturmer et al. | ........ | 192/89.24 X |
| 7,226,384 B2 * | 6/2007 | Tryon et al. | ............ | 192/70.17 X |
| 7,264,101 B2 * | 9/2007 | Hauck et al. | ............... | 192/55.61 |
| 7,934,997 B2 * | 5/2011 | Avins et al. | ............. | 464/68.1 X |
| 2004/0050647 A1 * | 3/2004 | Hayabuchi et al. | .......... | 192/212 |
| 2008/0257674 A1 * | 10/2008 | Sasse et al. | | |

* cited by examiner

*Primary Examiner* — Gregory Binda
*Assistant Examiner* — Matthieu Setliff
(74) *Attorney, Agent, or Firm* — Alfred J. Mangels

(57) ABSTRACT

A clutch unit including a torsional vibration damper and having at least friction clutch, but can have two friction clutches combined into a twin clutch. The torsional vibration damper includes an input component that extends axially over the at least one friction clutch at the outer circumference of the friction clutch, so that a counterpressure plate of the at least one friction clutch is disposed axially between the drive engine and energy accumulators carried by the torsional vibration damper. Thus, the clutch unit has a smaller axial extent and can be accommodated in limited installation spaces.

2 Claims, 1 Drawing Sheet

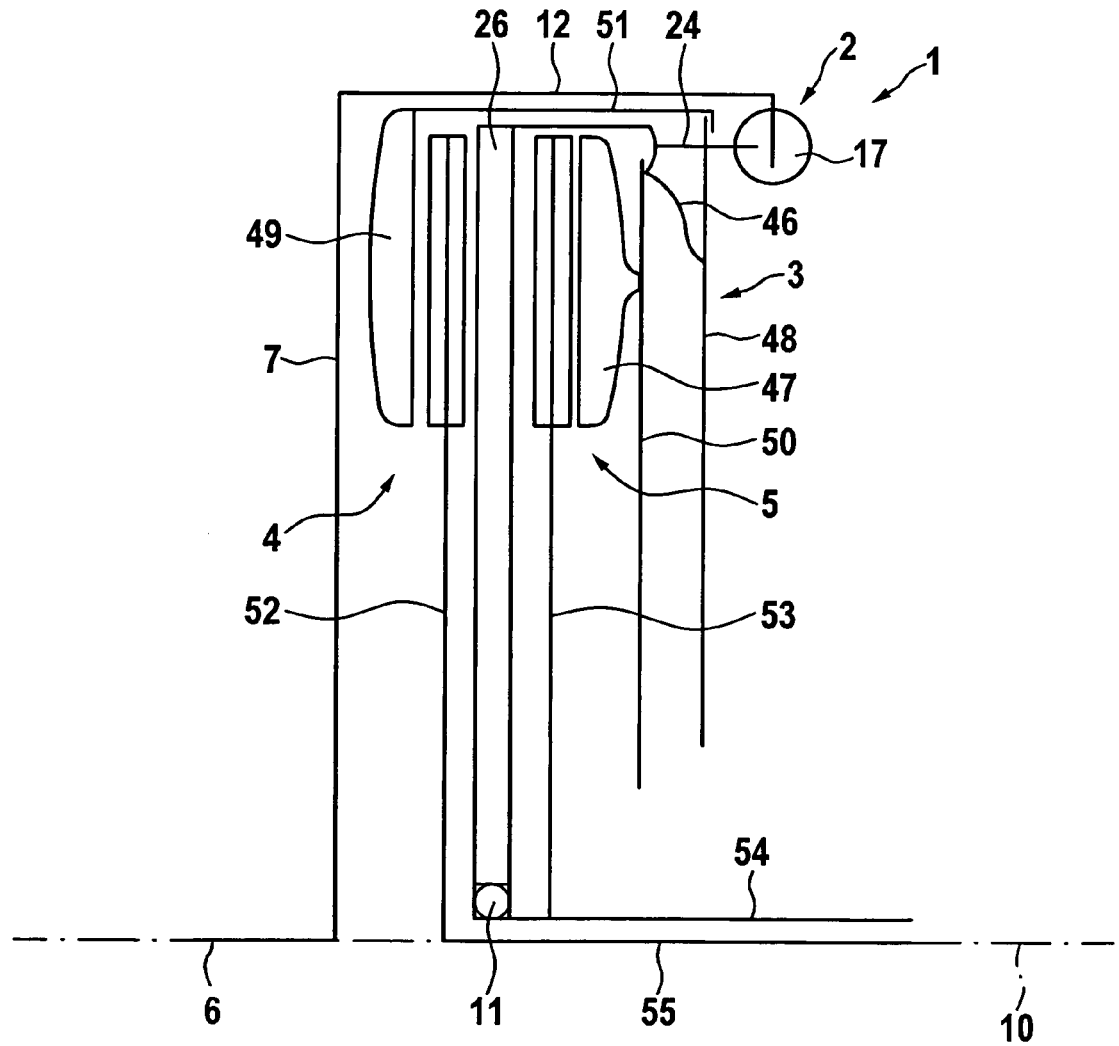

CLUTCH UNIT

BACKGROUND OF THE INVENTION

1. Field of the Invention

The present invention relates to a clutch unit including a torsional vibration damper with an input component rotatable relative to an output component against the effect of at least one energy accumulator, and including at least one friction clutch that is connected to the output component of the torsional vibration damper.

2. Description of the Related Art

Clutch units of the type identified above are known in the art, for example as dual mass flywheels with an integrated friction clutch, or as twin clutches with a torsional vibration damper connected in series. Such clutch units generally have to be installed in limited spaces between a drive engine and a transmission.

It is an object of the present invention to further reduce the installation space required by a clutch unit.

SUMMARY OF THE INVENTION

The above-identified object of the invention is achieved by a clutch unit including a torsional vibration damper with an output component rotatable within limits relative to an input component and against the effect of at least one energy accumulator. The clutch unit includes at least one friction clutch having a pressure plate that is nonrotatably and axially movably provided in a housing. A disk spring is operative between the housing and the pressure plate. The disk spring acts against the pressure plate in the direction of a clutch disk having friction linings and that is disposed between the pressure plate and a counterpressure plate.

The input component of the torsional vibration damper is connected to a flange component connected to the crankshaft of a drive engine, and the output component is connected to the friction clutch. The input component extends axially and radially outwardly of the friction clutch, and the at least one energy accumulator is disposed on the side of the counterpressure plate located opposite to the flange component. As a result of shifting the torsional vibration damper toward the transmission by the input component extending over the counterpressure plate and being disposed in a region of the friction clutch, installation space is saved and results in only a minor radial size increase by reason of the input component positioning and the requisite axial spacing from the counterpressure plate. The bulky components, such as the at least one energy accumulator, for example the circumferentially distributed coil springs that are controlled accordingly and are disposed in respective chambers in a grease lubricated mode of operation, are disposed in the region of the disk spring, or in the region of the disk springs in case the clutch is a twin clutch. In this instance, the at least one energy accumulator can be moved radially inwardly in a suitable arrangement of the clutch region, so that the energy accumulator does not extend radially beyond the input component, and so that it inwardly extends across from the outer periphery of the pressure plate. That can result in a substantially cylindrical configuration of the clutch unit, because the torsional vibration damper can be axially limited in the direction toward the transmission to the axial extent of the friction clutch, or of the friction clutches.

The clutch unit is advantageously connected to the crankshaft of the drive engine by means of a flange component, e.g. by means of a so-called axially elastic flexplate that is radially inwardly attached to the crankshaft. In the connection of the drive engine and the transmission, the flexplate is connected to the transmission-side-mounted clutch unit, in which it is connected to the input component of the torsional vibration damper or to a component associated therewith, by a form-locking connection, such as a threaded connection, a snap connection, or a bayonet connection.

BRIEF DESCRIPTION OF THE DRAWING

The structure, operation, and advantages of the present invention will become further apparent upon consideration of the following description, taken in conjunction with the accompanying drawing in which FIG. 1 shows in schematic form a partial cross-sectional view of an embodiment of a clutch unit in accordance with the present invention having a twin clutch.

DESCRIPTION OF THE PREFERRED EMBODIMENTS

FIG. 1 shows in a schematic, partial sectional view a clutch unit 1 that is rotatable about an axis of rotation 10. The clutch unit includes a torsional vibration damper 2 and a twin clutch 3 with two friction clutches 4, 5. The clutch unit 1 is arranged at a crankshaft 6 of a drive engine (not shown) by means of a disk-shaped flange component 7 that is connected to the crankshaft by a threaded connection. An input component 12 of the clutch unit 1 that is supported on the transmission input side by the bearing 11, which is only simply illustrated, is connected to the flange component 7. In the illustrated embodiment, the energy accumulator 17 is acted on by the input component 12.

An output component 24 of the torsional vibration damper 2 is connected to the twin clutch 3.

The twin clutch 3 is configured in a known manner with two friction clutches 4, 5, that can each be drawn closed. Pressure plate 47 of friction clutch 5 is directly acted upon by a disk spring 48, operating as a one-armed lever supported at the clutch housing 46. Pressure plate 49 of friction clutch 4 is acted upon by a disk spring 50, operating as a two-armed lever, that also is supported at clutch housing 46, wherein pressure plate 49 is acted upon by circumferentially distributed tie rods 51. The clutch disks 52, 53, having friction linings between respective pressure plates 47, 49 and counterpressure plate 26, are each connected to one of the respective transmission input shafts 54, 55, which are only schematically indicated, by a spline connection.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A clutch unit comprising:
    at least one friction clutch including a pressure plate nonrotatably and axially movably disposed within a clutch housing, a counterpressure plate, and a clutch disk with a friction lining positioned between the pressure plate and the counterpressure plate and rotatable about a clutch disk axis of rotation;
    a disk spring operative between the clutch housing and the pressure plate and by which the pressure plate is urged in the direction of the clutch disk; and
    a torsional vibration damper having an input component and an output component, wherein the input component is connected to a flange component that is connected to a crankshaft of a drive engine and extends axially over and radially outwardly of the at least one friction clutch, wherein the counterpressure plate is radially supported on a bearing carried by a transmission input shaft and wherein the output component is rotatable relative to the input component against the effect of at least one energy accumulator and is operatively connected with the at least one friction clutch, wherein the at least one energy accumulator is spaced from the counterpressure plate in an axial direction relative to the clutch disk axis of rotation and is disposed on a side of the counterpressure plate that is opposite from a side of the counterpressure plate that faces the flange component, and wherein the counterpressure plate and the at least one enemy accumulator radially overlap each other in a direction relative to the clutch disk axis of rotation.

2. A clutch unit in accordance with claim 1, wherein the at least one energy accumulator is axially across from an outer periphery of the counterpressure plate.

* * * * *